(12) United States Patent
Teodorovic

(10) Patent No.: US 11,215,849 B2
(45) Date of Patent: Jan. 4, 2022

(54) PANTOSCOPIC TILT MEASUREMENT DEVICE

(71) Applicant: Marko Teodorovic, The Hague (NL)

(72) Inventor: Marko Teodorovic, The Hague (NL)

( * ) Notice: Subject to any disclaimer, the term of this patent is extended or adjusted under 35 U.S.C. 154(b) by 0 days.

(21) Appl. No.: 16/902,363

(22) Filed: Jun. 16, 2020

(65) Prior Publication Data
US 2020/0393704 A1 Dec. 17, 2020

Related U.S. Application Data

(60) Provisional application No. 62/862,158, filed on Jun. 17, 2019.

(51) Int. Cl.
G02C 13/00 (2006.01)
G06T 11/60 (2006.01)
G06Q 30/06 (2012.01)
G06T 7/73 (2017.01)

(52) U.S. Cl.
CPC ....... *G02C 13/003* (2013.01); *G06Q 30/0601* (2013.01); *G06T 7/73* (2017.01); *G06T 11/60* (2013.01); *G06T 2200/24* (2013.01); *G06T 2207/30201* (2013.01)

(58) Field of Classification Search
CPC .................................................... G02C 13/003
See application file for complete search history.

(56) References Cited

U.S. PATENT DOCUMENTS

| 4,177,571 | A | 12/1979 | Renier |
| 7,740,355 | B2 | 6/2010 | Sessner et al. |
| 7,950,800 | B2 * | 5/2011 | Nauche ................ G02C 13/005 351/204 |
| 7,996,997 | B2 | 8/2011 | Warntjes et al. |
| 8,182,089 | B2 | 5/2012 | Sayag |
| 8,333,473 | B2 | 12/2012 | Wada |
| 9,198,576 | B1 * | 12/2015 | Barnes ..................... A61B 3/14 |
| 9,395,562 | B1 * | 7/2016 | Nguyen ............... A61B 3/0025 |
| 10,386,657 | B2 * | 8/2019 | El-Hajal ............... G02C 13/005 |
| 2005/0206834 | A1 * | 9/2005 | D'Agostino ............ G02C 1/00 351/41 |
| 2012/0167124 | A1 * | 6/2012 | Abdeljaoued ...... H04N 21/4415 725/11 |
| 2013/0042489 | A1 * | 2/2013 | Katzman .................. G01C 9/12 33/200 |
| 2014/0218679 | A1 * | 8/2014 | Haddadi .............. G02C 13/005 351/204 |
| 2020/0262009 | A1 * | 8/2020 | Becker ................. B23K 31/125 |

FOREIGN PATENT DOCUMENTS

| AU | 2001100628 A4 | 12/2001 |
| FR | 2931001 A1 | 5/2008 |

* cited by examiner

*Primary Examiner* — Phi Hoang

(57) ABSTRACT

A method of measuring pantoscopic tilt of spectacles includes a) providing a spectacle frame comprising a spectacle frame front and temples; b) placing the spectacle frame on a user's face in a position of normal wear; c) providing an image recording apparatus which contains spatial orientation sensors; d) positioning the image recording apparatus to capture a side view image of the user wearing the spectacle frame; e) capturing an image of the user wearing the spectacle frame, wherein a profile of the spectacle frame front is visible, and recording spatial orientation data with the image recording apparatus; f) determining pantoscopic tilt of the spectacle frame.

5 Claims, 5 Drawing Sheets

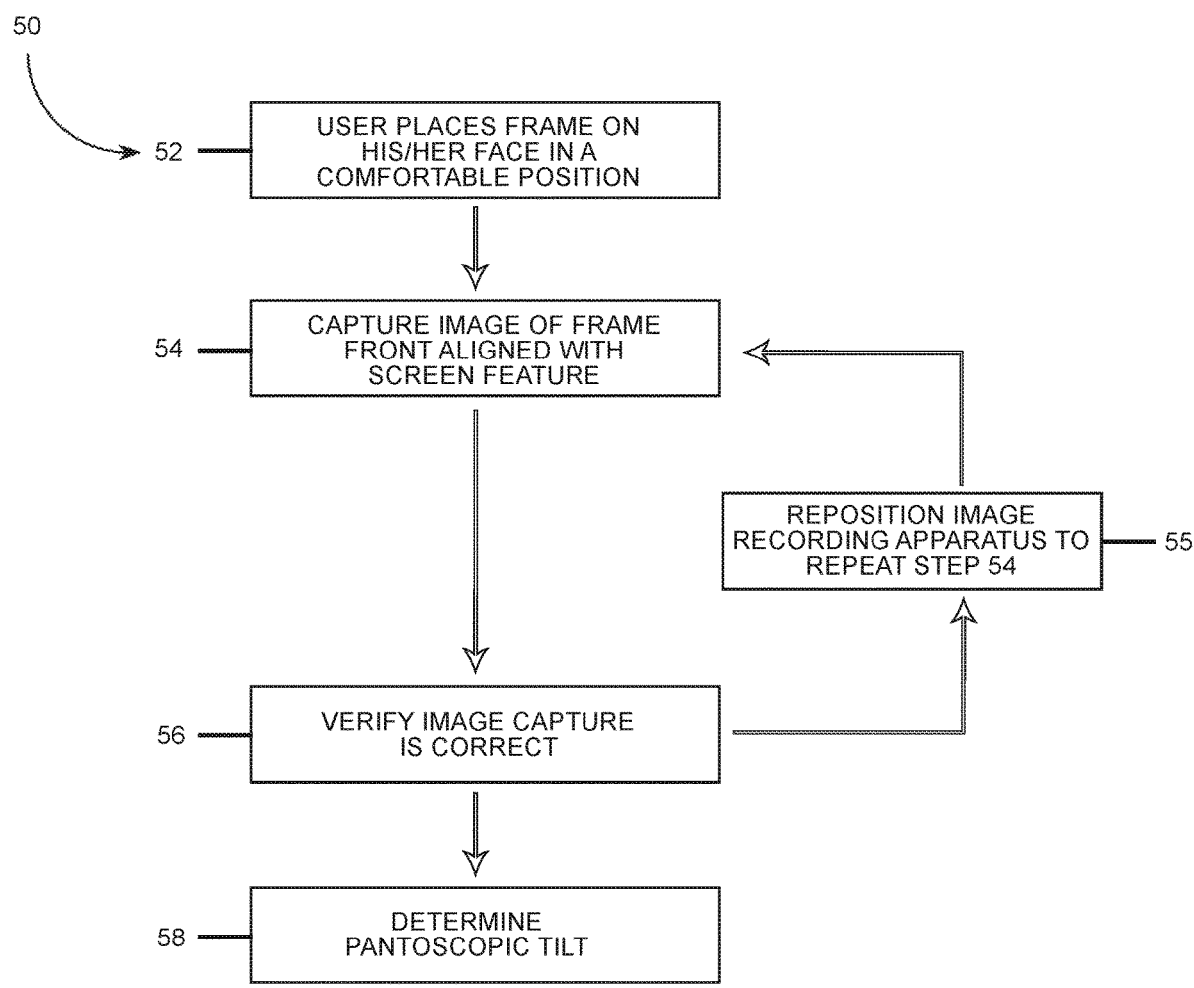

PANTOSCOPIC TILT MEASUREMENT DEVICE

BACKGROUND

Pantoscopic tilt is an important parameter for manufacture of corrective spectacles. It is generally defined as a tilt of the spectacle frame front in relation to the vertical line, as defined by gravity, and is measured in degrees. Pantoscopic tilt is caused by two factors: design of the spectacle frame and the head posture of the user.

Corrective spectacles are made by glazing (or mounting) ophthalmic lenses into spectacle frames. Certain types of ophthalmic lenses which are made to order for the user, commonly known as prescription ophthalmic lenses, explicitly require pantoscopic tilt as an input in their manufacture. Most other ophthalmic lenses assume an average pantoscopic tilt value. This average pantoscopic tilt value is at ophthalmic lens manufacturer's discretion and is usually between 8 and 12 degrees. Therefore, it is important for opticians who sell the corrective spectacles to check if the actual pantoscopic tilt for the spectacle frame chosen by the user is within this range. Otherwise the glazed ophthalmic lenses may not provide the optimal viewing experience to the user and may not provide the prescribed correction. Hence, it is important that pantoscopic tilt is measured accurately for each user and the chosen spectacle frame prior to manufacture of corrective spectacles, irrespective of the type of ophthalmic lens prescribed or chosen by the user.

Currently, pantoscopic tilt is measured in various ways. Most commonly it is measured by manual tools based on the principle of plumb line, wherein the flat surface of the tool is placed on the surface of the spectacle frame or trial lens and an indicating part moves so as to indicate the angle of tilt. One such manual device is described in US patent application publication no. US2013/0042489 A1. The main problem of manual tools is their inherent inaccuracy since the movable part of the device may not fully tilt due to friction. In addition, determining the exact angle value from the dial is often difficult. Alternatively, automated systems for measurement of many optical parameters, including pantoscopic tilt, can be used. One such system is described by U.S. Pat. No. 7,740,355. The main disadvantages of these automated systems are their high cost and cumbersome method(s) of use. Trained personnel is required for either of the current pantoscopic measurement methods, which restricts their use to optical shops or optometrist practices. This is clearly not ideal with respect to online commerce and would not meet the needs of online optical retailers.

SUMMARY

In a first embodiment of the invention, a method for measurement of pantoscopic tilt includes:

a) providing a spectacle frame composed of a frame front and two temples, b) providing an image recording apparatus which includes sensors to determine orientation of said apparatus in space along all three axes, and which can display and record spatial orientation information, c) displaying an alignment feature superimposed on a recording apparatus image feed in real-time, d) positioning the image recording apparatus in such a way so as to align the alignment feature superimposed on a real-time image with a certain part of the spectacle frame, e) capturing the aligned image described in step d and at the same time recording spatial sensor data, f) determining pantoscopic tilt from spatial sensor data.

Given that modern sensors can measure spatial orientation data very accurately, this method can be used to get precise measurements of pantoscopic tilt.

According to an embodiment of the invention the method comprises of the image recording apparatus being positioned in such a way that the profile of the spectacle frame front is fully visible and that in step c) the alignment feature is aligned with the spectacle frame front lengthwise. This can make the alignment more precise and therefore measurement of pantoscopic tilt more accurate. Further, while capturing the image in step e) the spectacle frame front profile should appear as thin as possible while being displayed to ensure correct positioning of the image recording apparatus, thus increasing measurement accuracy. Optionally, the image capture in step e) can be done automatically when predetermined image parameters are satisfied, such as the frame front profile being fully visible.

According to a further embodiment, the method comprises attaching a feature, such as a marker strip with symbols of known dimensions and positioning, to the spectacle frame temple which is going to be visible in step d). This feature can aid in calculating the relative spatial positions of the image capturing apparatus and the spectacle frame and facilitate automated image capture. Optionally, this spatial data can be used to improve accuracy of pantoscopic tilt measurement.

According to a further aspect of the invention, a system comprises a computer with a user interface; and a non-transitory computer readable program for causing the computer to perform the following steps when executed: displaying the alignment feature c) on the display; instructing the user to position the image recording apparatus as described in d); instructing the user to record the image or optionally performing step e) automatically when given parameters are satisfied; and displaying the pantoscopic tilt from spatial sensor data. Optionally, the determined pantoscopic tilt and/or spatial sensor data can be transmitted to another device specified by the user in the user interface.

According to an embodiment, the system comprises an image recording apparatus, such as a smartphone or a tablet computer, which includes at least the elements of: a camera, display, spatial orientation sensors, user interface and computational hardware.

In addition, it is foreseeable that any of the aforementioned embodiments may be implemented in combination with or via a non-transitory computer-readable storage medium. The non-transitory computer-readable storage medium may execute a program or cause a computer or similar device configured to execute a program in accordance with any of the aforementioned embodiments and/or method steps described herein. Further, the non-transitory computer-readable storage medium may be stored locally or provided via an external source or device.

BRIEF DESCRIPTION OF THE DRAWINGS

The invention will be discussed in more detail below, with reference to the attached drawings, in which:

FIG. 4 shows a flow chart depicting a process of measuring pantoscopic tilt.

DETAILED DESCRIPTION

Figure 1:
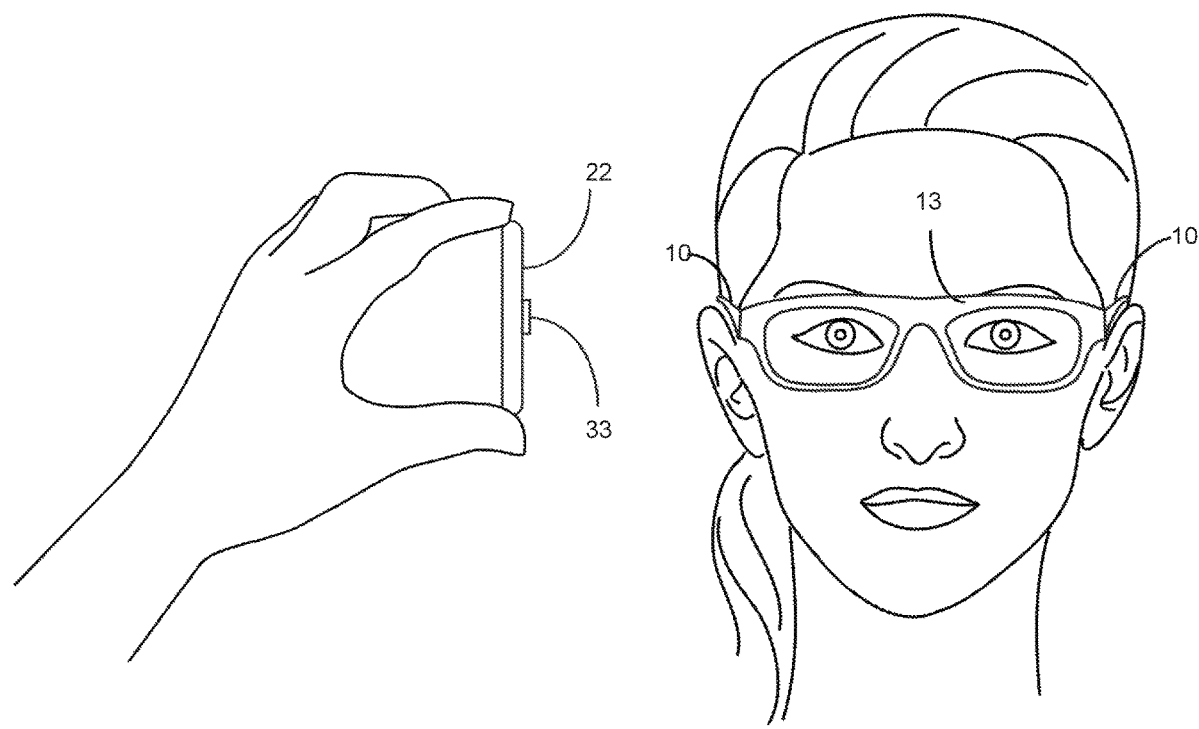
FIG. 1 shows a frontal view of a user and an image recording apparatus.

FIG. 1 shows a front view of the user wearing a spectacle frame consisting of a frame front 13 and temples 10 on both sides of the frame front. FIG. 1 also shows a profile view of the image recording apparatus 22 during image alignment and capture.

Figure 2A:
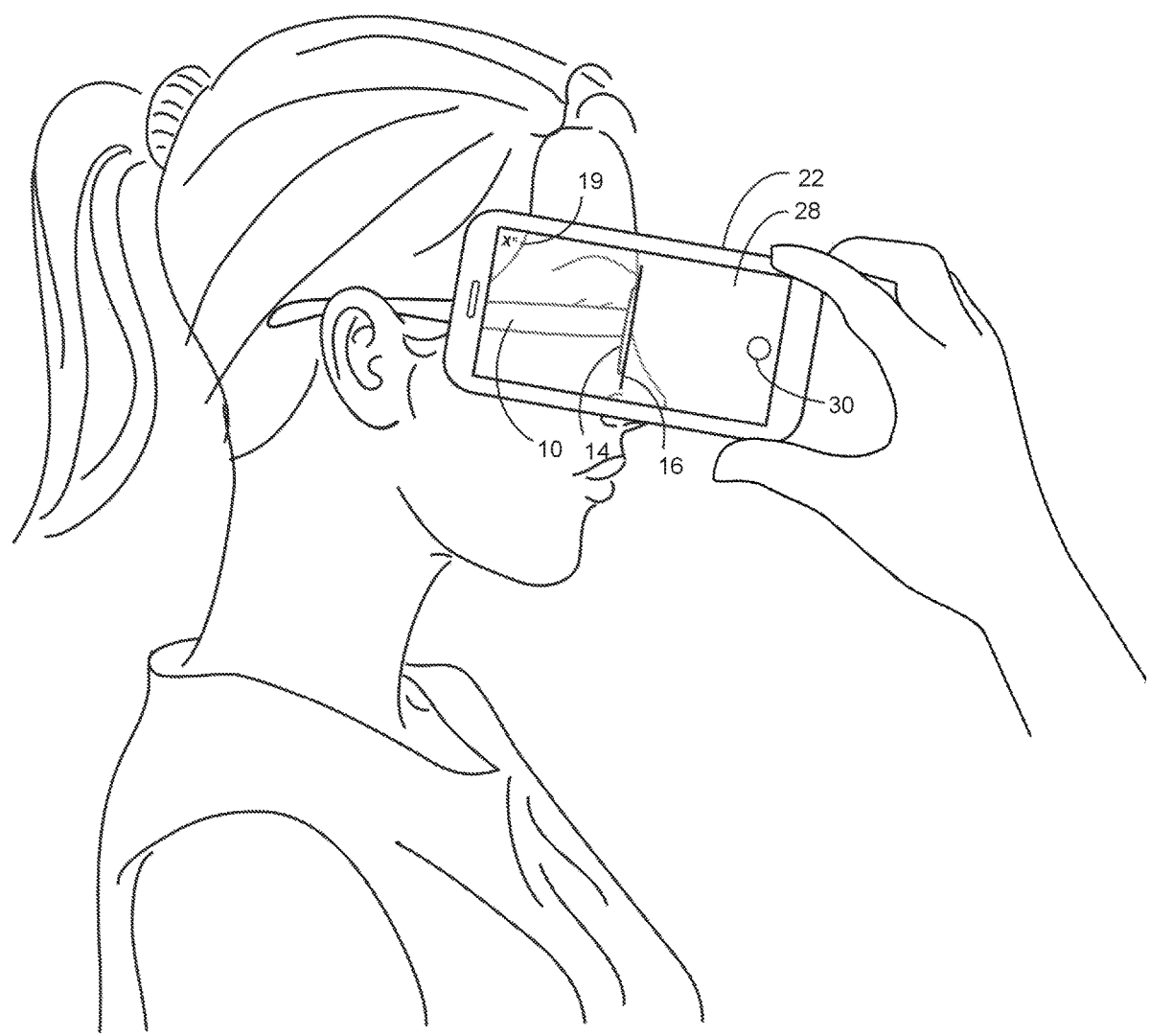
FIG. 2a shows a side view of a user and an image recording apparatus with a display showing an image feed.

FIG. 2a shows a side view of the user and image recording apparatus 22 during image alignment and capture.

Figure 2B:
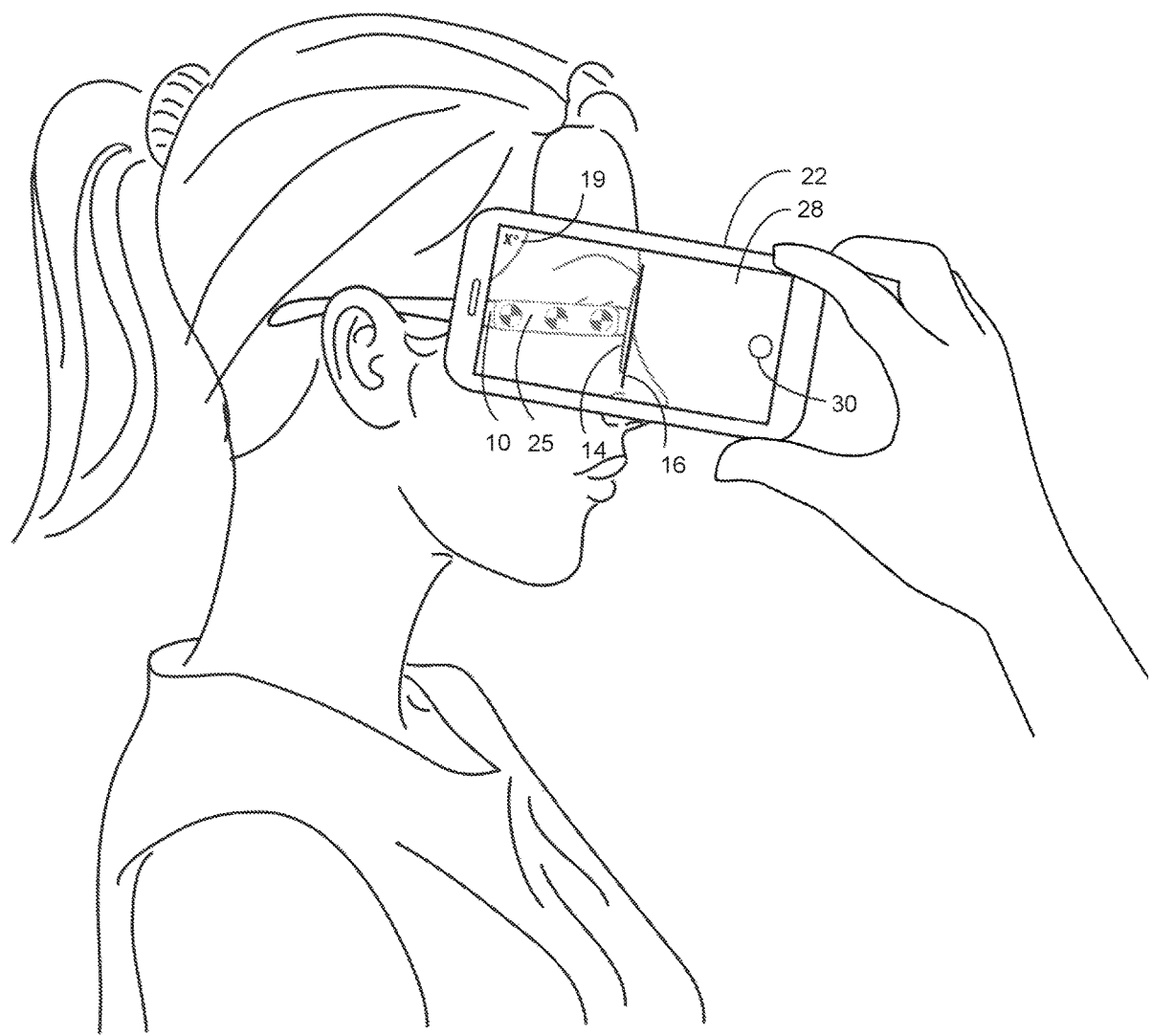
FIG. 2b shows a side view of a user and an image recording apparatus with a display showing an image feed wherein a marker strip is attached to a spectacle frame temple.

FIG. 2b also shows of the user and image recording apparatus 22 during image alignment and capture with a marker strip 25 attached to the spectacle frame temple 10.

Figure 3:
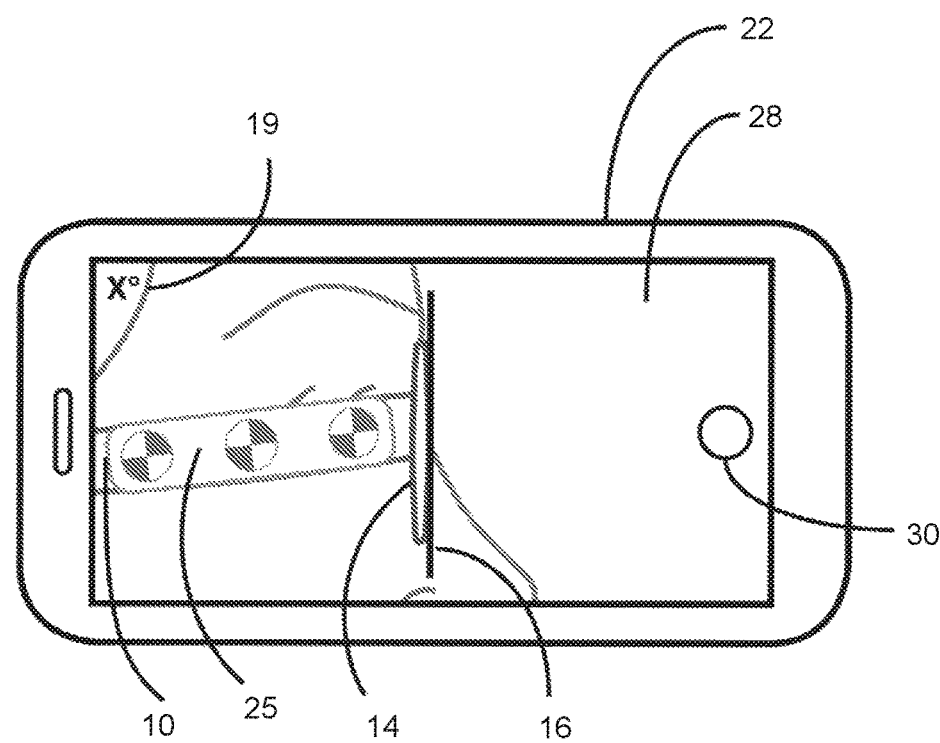
FIG. 3 shows a close-up view of the image captured and displayed by an image recording apparatus.

FIG. 3 shows a close-up view of the image captured and displayed by an image recording apparatus.

FIG. 4 shows a flow chart depicting a process of measuring pantoscopic tilt. The process with be discussed in combination with the images of the process shown in FIGS. 1-3.

Each of FIGS. 1-3 include a spectacle frame, which consists of two frame temples 10 joined at the hinges with the frame front 13, frame front side profile 14, an image recording apparatus 22 with a capturing lens 33, display 28, alignment feature 16, and pantoscopic tilt read-out 19 on the display.

Image recording apparatus 22 is a handheld electronic device, for example, a smartphone, a tablet computer or other handheld device which is capable of capturing an image, has a display, computational hardware, and spatial orientation sensors such as gyroscopes and accelerometers. The image recording apparatus 22 can include a computer system, software, an application and/or other configuration to perform at least one or more steps of method 50 shown in FIG. 4. Spectacle frame is an actual frame chosen by the user in a shop or via an internet website, usually including temporary trial lenses instead of corrective lenses. Prior to image capture the user may enter information regarding the spectacle frame into the user interface of the image recording apparatus 22 to specify the spectacle frame used for method 50, and/or an order number or other input associated with the user to link the pantoscopic tilt measurement to a particular user and the chosen spectacle frame.

When preparing for image capture, the user should have a natural posture of the head and neck for viewing an object in the distance, as shown in FIG. 2a. It is important for accurate pantoscopic tilt measurement that the user does not lower his or her head downwards or tilt it upwards, but rather maintains it in a comfortable position while looking in a distance preferably straight ahead. In addition, it is not desirable for the user to bend their back, but rather keep it straight in a natural position for walking.

Next, the image recording apparatus 22 is positioned so that it is parallel to either of the spectacle frame temples 10, as shown in FIG. 1. The capturing lens 33 should be positioned in such a manner that it captures the image showing part of the temple 10 and most of the spectacle frame front side profile 14 as it is positioned on the user's face.

The images recorded by the capturing lens are shown on display 28 in real-time. Display 28 shows an exemplary alignment feature 16 superimposed on the real-time image feed from the capturing lens 33 in FIG. 2a. Alignment feature 16 can be a line or a curve clearly distinguishable from the image feed and positioned at an angle to the lines defining the display edge, irrespective of the recording apparatus orientation (portrait or landscape).

In an embodiment, the alignment feature 16 is not shown on display 28. Instead, a recorded image of the frame front side profile 14 is analyzed computationally and the line defining the alignment feature 16 is mathematically constructed and used for calculating pantoscopic tilt. These computations can be made on the apparatus itself or any other external device.

FIG. 2a shows a preferred embodiment wherein the image recording apparatus 22 is positioned so that the frame front side profile 14 image aligns with the alignment feature 16 as shown on the display 28. To ensure accurate measurement, the display 28 should only be showing the surface of the spectacle frame front side profile 14, not either of the front or back surfaces of the spectacle frame front 13, which indicates appropriate placement of the image recording apparatus 22 and the capturing lens 33.

In a preferred embodiment, once the image recording apparatus 22 is positioned so that the spectacle frame front side profile 14 aligns with the alignment feature 16 as shown in FIG. 2a, an image is captured by pressing the recording portion 30 of the display 28. At the same time, spatial orientation sensor data is recorded and shown on the display 28 as measured pantoscopic tilt shown on the read-out 19.

FIG. 2b shows an embodiment of a system, showing a marker strip 25 attached to the temple 10 which is shown on the display 28. In this embodiment, the marker strip 25 facilitates the measurement of distance and position of the spectacle frame temple 10 in relation to the capturing lens 33. Optionally, the marker strip 25 can aid in automating image capture and recording spatial orientation sensor data, as well as improving pantoscopic tilt measurement.

FIG. 3 shows verification of the pantoscopic tilt measurement. Here, the user is shown the captured image including the read-out of pantoscopic tilt 19 shown on display 28 of the image recording apparatus 22. Next, the user can compare the position of the spectacle frame front side profile 14 and the alignment feature 16. If they align, as shown in FIG. 3, the user completes the measurement process by noting the pantoscopic angle read-out 19 on the display 28 and pressing the recording portion 30 to finish. Otherwise, the process has to be repeated.

In an embodiment, comparison of the relative positions of the frame front side profile 14 and the alignment feature 16 can be done computationally on the image recording apparatus or another external device by analyzing the captured image and spatial orientation sensors' data.

Optionally, recording portion 30 enables transfer of recorded data, the captured image, and user and spectacle frame information to a computer system selected by the user in a format selected by the user. This could be an email or other type of electronic message sent to an email address or other type of electronic inbox. The communication and data transfer between image recording apparatus 22 and other systems can be through a network connection, or through a wireless connection.

FIG. 4 shows a method 50 consisting of steps and are discussed in relation to FIGS. 1-3:

Step 52: Placement of the spectacle frame on the user's face in a comfortable position.

FIGS. 1 and 2a show the user with the spectacle frame placed on her face in a comfortable position as spectacles are intended to be worn, generally at a distance of 8 to 15 mm between the eyes and the back surfaces of the trial lenses.

Step 54: Capture of the image of the frame front aligned with the screen feature. Image recording apparatus is positioned as shown in FIG. 1 so that the captured images are displayed as shown in FIG. 2a. Image and sensor data are recorded either manually by selecting recording portion 30 or automatically.

Step 56: Image verification

In this step, the user visually compares the alignment of the frame front side profile 14 in relation to the screen feature 16. Alternatively, this comparison can be done computationally, without user input.

Step 55: Reposition the image recording apparatus

If it is the case that it is determined in step 56 that there is misalignment of the frame front side profile 14 and screen feature 16, the user can reposition the image recording apparatus to repeat step 54. The user may make this determination or may be prompted by the user interface to perform this step based on computations which can be performed in step 56.

Step 58: Determine pantoscopic tilt

This step can be done by analyzing the data collected from one or more sensors, such as spatial orientation sensors, in the image recording apparatus 22. These sensors generally include, but are not specifically limited to, gyroscopes and accelerometers, which measure data regarding the spatial orientation of the image recording apparatus, and more specifically angles in relation to the gravity vector. As the image recording apparatus 22 is moved, the spatial orientation sensors' data changes and thus pantoscopic tilt measurement, which is shown as a real-time read out 19 in degrees on the display 28. In an embodiment, the pantoscopic tilt can be measured but not displayed on the display 28.

The invention claimed is:

1. A method of measuring pantoscopic tilt of spectacles, the method comprising:

a) providing a spectacle frame comprising a spectacle frame front and temples;
b) placing the spectacle frame on a user's face in a position of normal wear at a distance of 8 to 15 mm from the eye to spectacle frame front back side;
c) providing an image recording apparatus which contains spatial orientation sensors;
d) positioning the image recording apparatus to capture a side view image of the user wearing the spectacle frame;
e) capturing an image of the user wearing the spectacle frame, wherein a profile of spectacle frame front is visible, and recording spatial orientation data of the image recording apparatus;
f) determining pantoscopic tilt of the spectacle frame by reading spatial orientation data recorded in step e) the user having attached a marker strip to one of the temples prior to step b) in order to aid with steps e) and f) by determining relative spatial positions of the spectacle frame and the image capture apparatus thereby increasing pantoscopic tilt measurement accuracy.

2. The method of claim 1, further comprising aligning the image recording apparatus with the spectacle frame front profile prior to step e).

3. The method of claim 2, further comprising using an alignment feature to align the image recording apparatus with the spectacle frame front profile.

4. The method of claim 1, wherein the captured image is verified for correct alignment of the image recording apparatus prior to step f).

5. The method of claim 1, wherein the pantoscopic tilt is determined by first performing computational analysis of the captured image verifying presence of the frame front profile and subsequently reading spatial orientation sensors' data to display an angle of tilt.

* * * * *